Dec. 6, 1960 V. C. WEBB 2,962,954
AERATION APPARATUS FOR STORAGE BINS
Filed Nov. 25, 1957 2 Sheets-Sheet 1
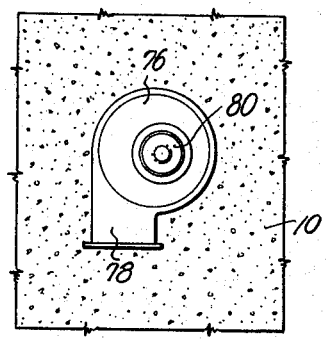
Fig. 1.
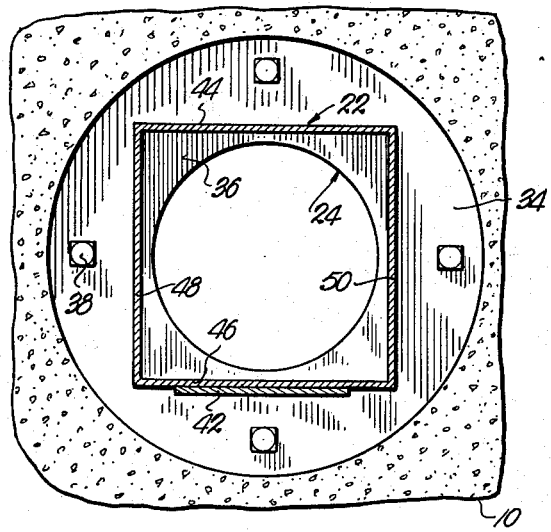
Fig. 5.
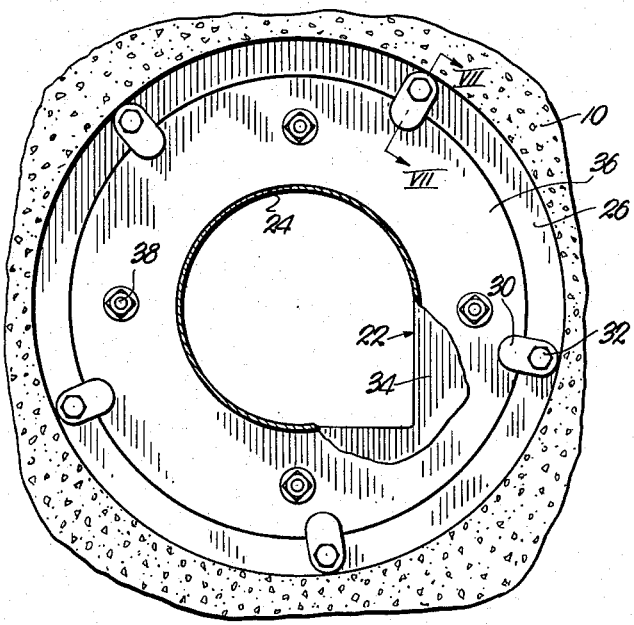
Fig. 6.
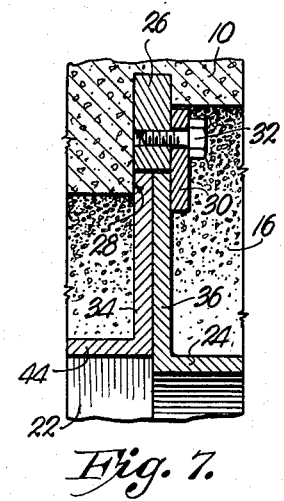
Fig. 7.
INVENTOR.
Venard C. Webb
BY 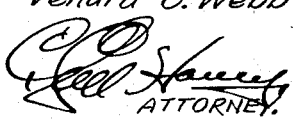
ATTORNEY.

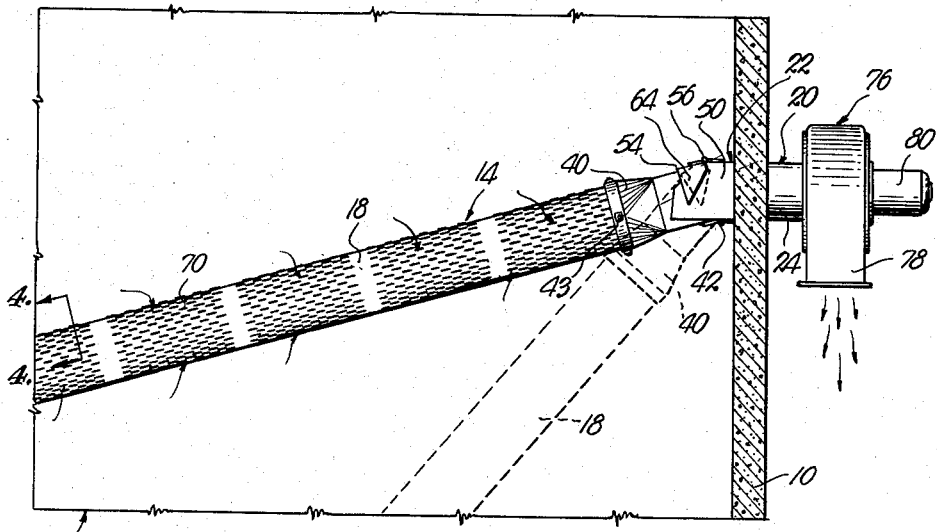
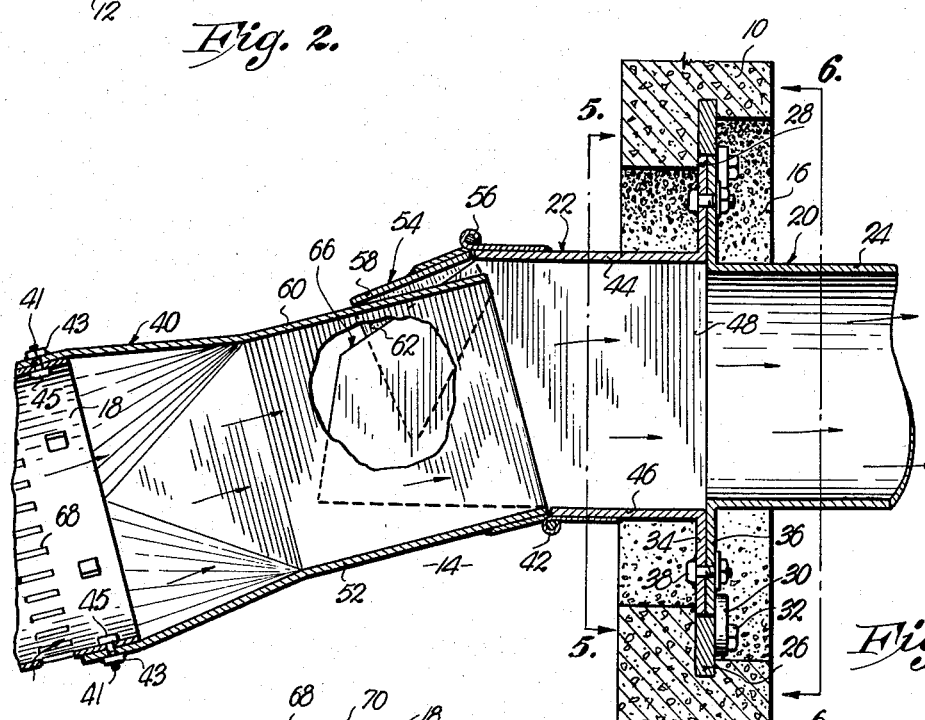
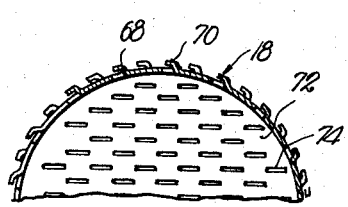

United States Patent Office 2,962,954
Patented Dec. 6, 1960

2,962,954

AERATION APPARATUS FOR STORAGE BINS

Venard C. Webb, 669 S. 10th St., Salina, Kans.

Filed Nov. 25, 1957, Ser. No. 698,421

3 Claims. (Cl. 98—56)

This invention relates to the storage of grain, and more particularly to apparatus for alleviating the problems incident to heating and, therefore, damage to the grain itself because of the inherent moisture content thereof.

It is the primary object of the present invention to provide aeration apparatus capable of moving air through the grain while the same is stored, and without the necessity of moving or otherwise handling the grain as has heretofore been customary in an attempt to solve the problems above referred to.

The most important object of the present invention is to provide aeration apparatus that is adapted for use in connection with existing structures to the end that the same may be inserted into the bin through the conventional opening or manhole without altering the bin structure, and particularly without cutting additional openings in the bin wall.

A further object of the present invention is to provide aeration apparatus that may be mounted in existing manholes or the like forming a part of the bin, all in a manner to present a seal around the manhole and thereby assure that all of the air being drawn through the grain will be expelled from the outlet of the blower or other air moving mechanism.

A still further object of the present invention is to provide aeration apparatus that includes a swingable, perforated tube capable of descending with the descent of the grain during removal from the bin.

In the drawings:

Fig. 1 is a fragmentary, elevational view of a grain storage bin showing aeration apparatus made pursuant to the present invention.

Fig. 2 is a fragmentary, vertical, sectional view through the bin and showing the said apparatus in elevation.

Fig. 3 is an enlarged, fragmentary, vertical, sectional view through the aeration apparatus showing the same operably attached to the side wall of the storage bin and extending through the conventional manhole thereof.

Fig. 4 is an enlarged, fragmentary, detailed, cross-sectional view taken on line 4—4 of Fig. 2.

Fig. 5 is a fragmentary, cross-sectional view taken on line 5—5 of Fig. 3.

Fig. 6 is a fragmentary, cross-sectional view taken on line 6—6 of Fig. 3; and

Fig. 7 is an enlarged, fragmentary, detailed, cross-sectional view taken on line 7—7 of Fig. 6.

The aeration apparatus shown in the drawings mounted on side wall 10 of a grain storage bin 12, includes an elongated tube broadly designated by the numeral 14 and extending through an opening 16 formed in the wall 10 of the bin 12. That part of the tube 14 which is disposed within the bin 12 is foraminous throughout substantially the entire length and circumference thereof and, accordingly, it is seen that tube 14 is provided with a perforated section 18 and an imperforate section 20, the latter of which is in turn subdivided into a pair of lengths 22 and 24.

The opening 16 is conventionally provided in the wall 10 and is defined by a continuous ring 26 embedded therein and normally receiving a cover plate (not shown) which, when in place, is removably held within the ring 26 against shoulder 28 of wall 10 by a plurality of fasteners in the nature of lugs 30 swingable on the ring 26 through the medium of bolts 32.

Such construction of the opening is advantageously employed in mounting the tube section 20 within the opening 16, and to this end, the lengths 22 and 24 are provided with external flanges 34 and 36 respectively, adapted to fit snugly within the inner periphery of the ring 26, it being understood of course, that the configuration of said innermost periphery of ring 26 will determine the shape of the outer peripheries of flanges 34 and 36.

Flanges 34 and 36 are in face-to-face inter-engagement and releasably held together by a series of bolts and nuts 38.

Since the total thickness of flanges 34 and 36 is equivalent to the thickness of the ring 26, the lugs 30 are adapted to hold the flange 34 against the shoulder 28 when the fasteners 30 are turned into partial overlapping relationship to the flange 36. Such construction seals the opening 16 around the tubular section 20.

Tubular section 18 has removably secured thereto imperforate end length 40 that is partially telescoped within the proximal end of imperforate length 22 and swingably attached thereto through the medium of hinge means 42. The tube length 22 is transversely polygonal presenting top and bottom walls 44 and 46 respectively and side walls 48 and 50. The imperforate length 40 of tubular section 18 is of similar cross-sectional configuration and, therefore, spans the distance between the side walls 48 and 50, bottom wall 52 of imperforate length 40 abutting the proximal edge of bottom wall 46 and having the hinge means 42 attached thereto. Accordingly, it is seen that both walls 44 and 46 are cutaway to the end that side walls 48 and 50 extend therebeyond.

That portion of end length 40 which telescopes with tubular section 18 is held in place by a number of bolts 41 having cooperating nuts 43 respectively, the latter being welded in place and against rotation when bolts 41 are manipulated through engagement of the polygonal heads 45 disposed inside section 18 and where they may be reached by an appropriate tool by the manipulator reaching through tube length 22, and imperforate length 40 after length 24 of imperforate section 20 has been removed.

Thus if tubular section 18 is embedded in grain and it becomes desirable to enter the bin 12 through opening 16, all parts of the assembly may be disconnected from section 18 without disturbing that section.

Means for sealing the joint between tubular lengths 22 and 40 throughout the path of vertical swinging movement of the foraminous section 18, includes a U-shaped flapper 54 that is swingably secured to the top wall 44 through the medium of a hinge 56. Bight 58 of flapper 54 slidably rests upon top wall 60 of imperforate length 40, and legs 62 and 64 of flapper 54 embrace the sides 48 and 50 of the imperforate length 22. The terminal ends of side walls 48 and 50 which extend beyond the top wall 44, are cut away to present downwardly and inwardly inclined, uppermost edges 66 which merge with the outer end of top wall 44 whereby to clear the flapper 54 as the foraminous section 18 swings to the lower end of its path of travel.

Tube section 18 is rendered foraminous by the provision of a plurality of elongated slots 68 formed by striking outwardly-extending ears 70 therefrom and disposed in spaced, overlapping relationship to the slots 68 to impede the entrance of grain into the tube section 18. Manifestly, the sides of the slots 68, or more particularly, the spacing between the ears 70 and the slots 68, should be selected in accordance with the size of the kernels of grain to be stored in the bin 12.

Tubular section 18 is also provided with an end wall 72 remote from the end length 40 thereof and having similar slots 74 therein which may be formed with struck-out ears (not shown) in the same manner as in the side wall of tube section 18.

Air suction means 76 in the nature of a blower, communicates at its inlet with tubular length 24 to which the blower 76 is attached. Outlet 78 of blower 76 is shown in Figs. 1 and 2 facing downwardly, and there is also illustrated a prime mover such as an electric motor 80, for driving the turbine (not shown) of the blower 76.

Manifestly, when the bin 12 is charged with grain, those parts of the aerating apparatus which are disposed within the confines of bin 12, are embedded in the grain. Consequently, it is but necessary to provide an air inlet (not shown) at the upper end of the bin 12 and to otherwise seal the latter in order to cause movement of air entirely through the grain upon operation of the air suction means 76. The air passing into the bin 12 at the top thereof, will flow downwardly through the grain and into the foraminous section 18 of tube 14 whence such air flows through the tubular parts 40, 22 and 24, into the blower 76 and thence to the atmosphere from outlet 78.

Storage bins 12 of the kind contemplated by the instant invention are normally provided with outlets (not shown) in or adjacent the bottoms thereof, through which the grain flows when the bin 12 is emptied; therefore, by virtue of the hinge connection 42, the foraminous section 18 is free to swing downwardly as a consequence of the downward movement of the grain toward the discharge opening of the bin 12. In this connection, and by way of explanation, the opening 16 should be selected relatively close to the bottom (not shown) of the bin 12 and when the foraminous section 18 has swung to the lowermost end of its path of travel, it will come to rest upon such bottom of the bin 12 whether said bottom is horizontal or inclined (as is common in many bins) and sloping downwardly and inwardly from adjacent opening 16.

In any event, even when the section 18 is at the lowermost end of its path of travel, the flapper 54 will still rest upon the top wall 60 in embracing relationship to the side walls 48 and 50 and present an effective seal so that all air being pulled by the suction means 76, will flow into the tubular section 18 and thence through the imperforate section 20 of tube 14.

Having thus described the invention what is claimed as new and desired to be secured by Letters Patent is:

1. In a grain storage bin having an opening in the side wall above the bottom thereof, the combination with the bin of aeration apparatus comprising an elongated, sectional tube, one section of the tube extending through said opening and being secured to said side wall; air suction means communicating with the outermost end of said one section of the tube, the other section being in the bin and having the innermost end thereof provided with an end wall, said other section being foraminous throughout substantially the entire length and circumference thereof, the opposite end of said other section being partially telescoped within the proximal end of said one section and hingedly secured to the latter to permit vertical swinging movement of said other section relative to said one section in response to change in the level of grain within the bin; and means hingedly secured to said one section and slidably engageable with the sides of the latter and the top of said other section in an overlying relationship to the other section, to thereby provide an extension for said one section to maintain the opposite end of said other section in a substantially telescoped relationship with said one section.

2. The invention of claim 1, wherein the bottom edge of said opposite end is hingedly secured to the innermost edge of the bottom wall of said one section to permit vertical swinging movement of said other section relative to said one section, said means including a U-shaped flapper having a bight hingedly secured to the innermost edge of the top wall of said one section and having legs embracing the side walls of the last-mentioned section, said bight slidably engaging the top wall of said opposite end to provide an extension for said one section and to substantially telescope said opposite end therewithin as said other section traverses the path of vertical swinging movement thereof.

3. The invention of claim 2, wherein the innermost edge of the top wall of said one section extends inwardly beyond the corresponding edge of the bottom wall of said one section, each of the side walls of the latter extending inwardly beyond the innermost edge of said top wall and having an inclined, terminal end merging with the last-mentioned edge to clear said flapper as said other section swings to the lower end of its path of travel.

References Cited in the file of this patent

UNITED STATES PATENTS

| 825,532 | Green | July 10, 1906 |
| 1,638,738 | Liehty | Aug. 9, 1927 |
| 1,766,742 | Campbell | June 24, 1930 |
| 2,126,107 | Gordon | Aug. 9, 1938 |
| 2,316,634 | Spear | Apr. 13, 1943 |
| 2,645,991 | Hobson | July 21, 1953 |
| 2,887,031 | Poole | May 19, 1959 |

FOREIGN PATENTS

| 1,116,931 | France | May 14, 1956 |
| 1,134,263 | France | Nov. 26, 1956 |